United States Patent [19]
Ensley

[11] Patent Number: 5,299,887
[45] Date of Patent: Apr. 5, 1994

[54] IN-SITU PROCESS FOR REMEDIATING OR ENHANCING PERMEABILITY OF CONTAMINATED SOIL

[76] Inventor: Donald L. Ensley, P.O. Box 955, Bodega Bay, Calif. 94923

[21] Appl. No.: 964,452

[22] Filed: Oct. 21, 1992

[51] Int. Cl.⁵ .............................................. B09B 1/00
[52] U.S. Cl. .................. 405/128; 166/248; 210/747; 405/258
[58] Field of Search ............... 405/128, 258; 166/248; 210/747, 748, 751; 588/249

[56] References Cited

U.S. PATENT DOCUMENTS

| | | | |
|---|---|---|---|
| 3,920,072 | 11/1975 | Kern | 166/248 |
| 3,948,319 | 4/1976 | Pritchett | 166/248 |
| 4,900,196 | 2/1990 | Bridge | 405/128 X |
| 4,957,393 | 9/1990 | Buelt et al. | 405/258 X |
| 4,973,811 | 11/1990 | Bass | 405/131 |
| 5,011,329 | 4/1991 | Nelson et al. | 405/128 |
| 5,065,819 | 11/1991 | Kasevich | 405/128 X |

*Primary Examiner*—Dennis L. Taylor
*Attorney, Agent, or Firm*—Arnold, White & Durkee

[57] ABSTRACT

A process for removing an undesired contaminant from a sub-surface soil matrix comprises the steps of forming a bore hole in the soil, moving a source of microwave energy through the bore hole while radiating electromagnetic energy laterally into the soil at a frequency and power density which selectively heat the contaminant in the soil by resonance absorption of the electromagnetic energy, collecting fluids which enter the bore hole, and removing the collected fluids from the bore hole. When the method is utilized in clay-type soils, the microwave energy is used to heat entrapped water or contaminant molecules sufficiently to vaporize those molecules and thereby create fissures in the soil to increase the hydrodynamic permeability of the soil.

15 Claims, 2 Drawing Sheets

IN-SITU PROCESS FOR REMEDIATING OR ENHANCING PERMEABILITY OF CONTAMINATED SOIL

FIELD OF THE INVENTION

The present invention relates generally to soil treatment processes and, more particularly, to an in-situ process for remediating and/or enhancing the hydrodynamic permeability of contaminated soil.

SUMMARY OF THE INVENTION

It is one primary object of the present invention to provide an in-situ soil remediation process for removing contaminants such as chlorinated hydrocarbons and radioactive wastes from the soil.

A further object of the invention is to provide such a process which allows the soil to remain essentially undisturbed and in a natural state.

It is another important object of this invention to provide a process for in-situ enhancement of the hydrodynamic permeability of soils such as clay.

Other objects and advantages of the invention will become apparent upon reading the following detailed description and upon reference to the drawings.

In accordance with the present invention, the foregoing objectives are realized by providing a process for removing an undesired contaminant from a sub-surface soil matrix, the process comprising the steps of forming a bore hole in the soil, moving a source of microwave energy through the bore hole while radiating electromagnetic energy laterally into the soil at a frequency and power density which selectively heat the contaminant in the soil by resonance absorption of the electromagnetic energy, collecting fluids which enter the bore hole, and removing the collected fluids from the bore hole.

When the method of this invention is utilized in clay-type soils, the microwave energy is used to heat entrapped water or contaminant molecules sufficiently to vaporize those molecules and thereby create fissures in the soil to increase the hydrodynamic permeability of the soil.

DETAILED DESCRIPTION OF THE PREFERRED EMBODIMENTS

Figure 1:
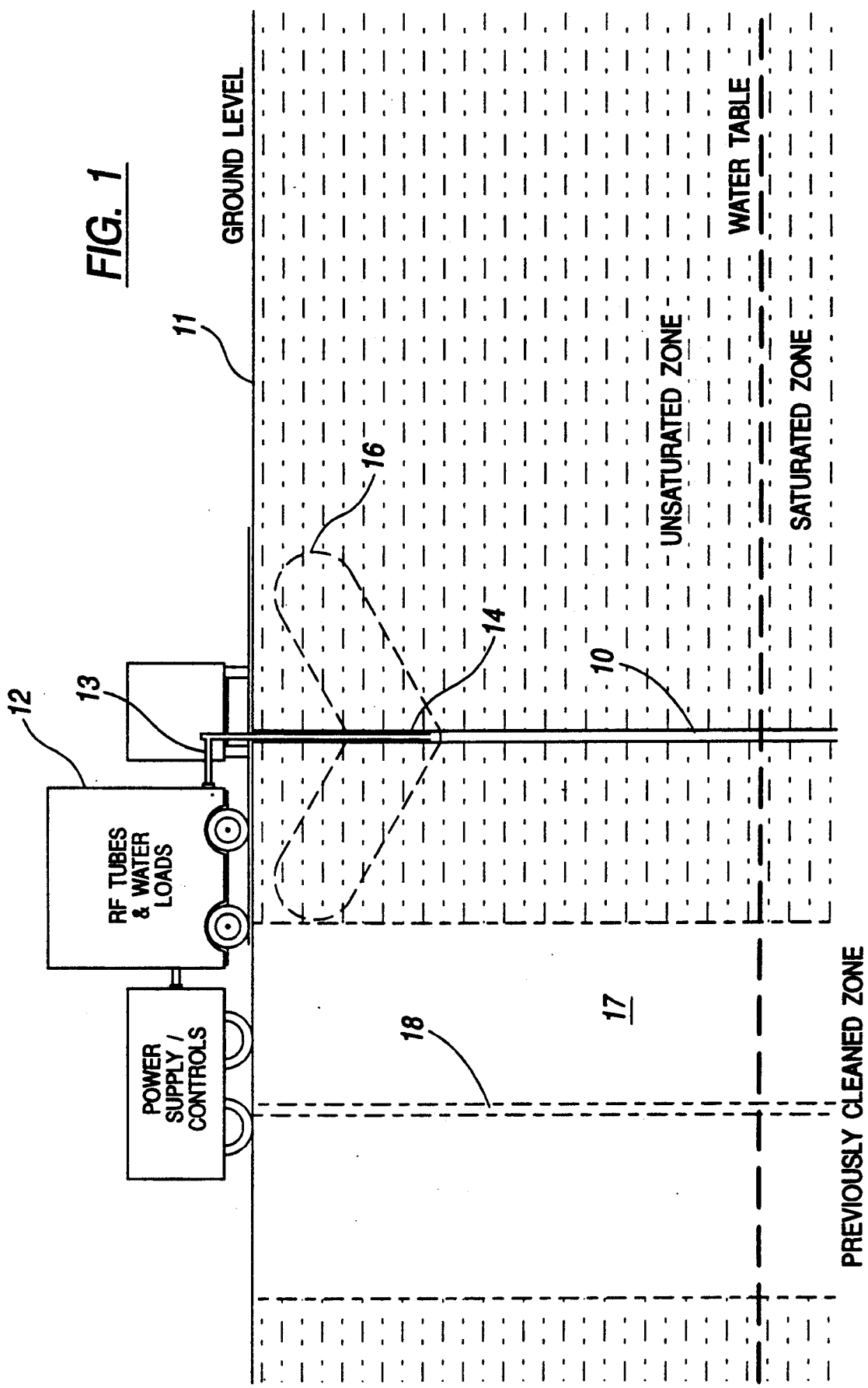
FIG. 1 is a diagrammatic illustration of a sub-surface soil matrix in the process of being remediated in accordance with the present invention.

While the invention is susceptible to various modifications and alternative forms, a specific embodiment thereof has been shown by way of example in the drawings and will be described in detail herein. It should be understood, however, that it is not intended to limit the invention to the particular forms disclosed, but on the contrary, the intention is to cover all modifications, equivalents, and alternatives falling within the spirit and scope of the invention as defined by the appended claims.

Turning now to the drawings and referring first to FIG. 1, a well shaft 10 is formed in a section of soil 11 containing one or more undesired contaminants such as chlorinated hydrocarbons ("CHC"). A high-power microwave source 12 (Magnetron) feeds power down the well shaft via a microwave transmission line 13 such as a flexible coaxial cable or waveguide. A radiating device 14 such as a slot waveguide radiator array or small exponential horns are provided at the lower end of the transmission line 13 for matching and to couple the power into the ground zones. A pumping head 15 at the bottom of the radiating device serves to remove contaminant through the transmission line 13. The transmission line 13 can have a hollow coaxial region for this purpose (for pumping both vapor and liquid phases). Alternatively, a separate conduit may be provided in the well shaft for withdrawing fluid contaminant.

As electromagnetic energy is radiated laterally from the radiating device 14 within the well shaft, contaminants within the soil are heated to a temperature sufficient to vaporize at least a portion of the contaminant within a certain distance from the radiating device 14. The pattern 16 of the radiating device 14 is preferably inclined upwardly, as illustrated in FIG. 1, so as to form an in-situ funnel shape for efficient forced removal of the contaminant. The effective pressure gradient for both the vapor and liquid phases is created by gravity, the pumping system and thermal gradients from the heating RF field.

As the radiating device 14 traverses the well shaft, successive zones of the surrounding soil are remediated by removal of at least a portion of the contaminants therein. A previously cleaned zone 17 around a well shaft 18 is illustrated in FIG. 1.

Figure 2:
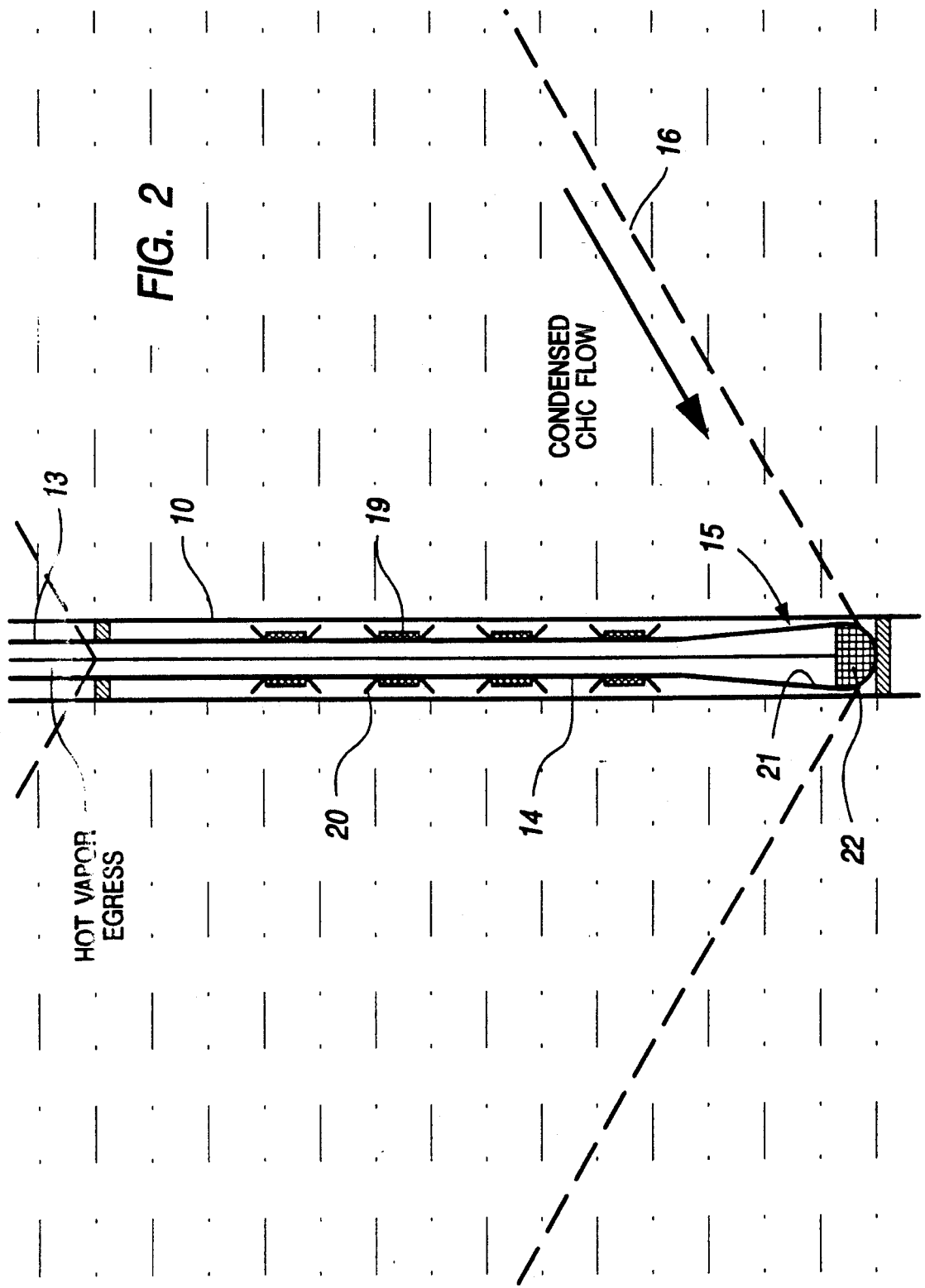
FIG. 2 is a more detailed diagrammatic of the downhole equipment used in the process illustrated in FIG. 1.

FIG. 2 is a more detailed illustration of a preferred radiating device 14 and pumping head 15. The radiating device is a phased array of radiating waveguide slots 19 covered with aluminum oxide screens which allow vapors to be drawn into the transmission line. An impedance-matching circuit 20 is provided on the periphery of each slot 19.

At the lowermost end of the transmission line, the pumping head 15 forms a bulbous chamber 21. The lower portion of this chamber 21 is formed by a screen 22 which allows liquids to enter the transmission line 13 from the bottom of the well shaft.

The microwave energy is directly absorbed by the CHC or other contaminants in the soil (CHC resonance heating). As CHC vapor formation increases, the vapor continues to absorb energy and flow through the soil. The pressure gradient in the CHC created from heating and gravity are both effective in determining the diffusion rate and overall soil egress for both liquid and vapor phase CHC. Possible non-thermal effects at the molecular level may also play a role in breaking down interfacial tension. The resonance absorption has the highest efficiency for thermal effects.

There are at least two major effects from the application of high power microwave energy to CHC-contaminated soil, both above and below the water table. One of these is related to local selective microwave absorption by the CHC (both heating and direct high frequency effects), and the other to micro-fractionation of various soil aggregates, including clay and rock formations, as a collateral result of the heating. The latter effect increases the local permeability and resulting diffusion rates for egress of both liquid and vapor phase CHC.

The heat-related effects are those which depend upon local temperature in CHC and ground water. These include vaporization, viscosity (which influences the diffusion rate of CHC in porous earth), vapor pressure and surface tension (both of which affect the rate of removal of CHC in liquid and gas phases through porous material). The ability of the microwave field absorption to effectively discriminate between air, sand, rock, water and other materials and CHC forms the basis for "reaching into" and interacting with the CHC system and not wasting energy on other extraneous materials.

Also of interest are direct or non-thermal effects. The microwave-induced high frequency molecular level CHC and water rotational energy may materially reduce CHC viscosity and, more importantly, break down the inter-molecular forces which form the film around CHC contaminants in water-filled porous material, as well as reducing interfacial tension. For short pulses, the absorbed energy is not spread over a thermal distribution in this effect, so potentially less energy is needed.

Clay and rock micro-fractionation, based upon microwave-induced temperature and pressure gradients, may increase the effective permeability to values near that of coarse sand. The effect is a result of rapidly increasing the local CHC or water temperature within host clay or porous rock formations, caused by "bootstrap" microwave heating as a result of very small initial confined absorbing regions and high microwave Poynting flux. The RF absorption, thermal conductivity and specific heat are all functions of local temperature, which can lead, under appropriate circumstances, to run-away heating up to some relatively high vapor temperature and pressure in a very short time compared to the heat transfer time constant for the material. The local pressures can reach many atmospheres and fracture or open "closed-cell" host structure during the RF pulse.

The basic electrodynamics of interaction between an electromagnetic wave and a lossy, perhaps magnetically active substance can be understood on the basis of solving Maxwell's equations for a general dielectric characterized by a space and frequency dependent permittivity $\epsilon$ and permeability $\mu$. The complex form will be designated by the usual symbols, $\epsilon = \epsilon' + i\epsilon''$, where the single prime means real part and the double prime is imaginary part. In general, $\epsilon$ and $\mu$ are tensors. For simplicity here and in light of the expected more or less isotropic nature of sub-soil contamination, one can use a simple trace form representing the magnitude of the dielectric permittivity.

The constitutive equations used include the effects of material polarization (D rather than E) so $D = \epsilon(\omega)E$, and active magnetic properties (H rather than B), so $B = \mu(\omega)H$. Maxwell's equations for the fields within the material then become, $$\nabla \times E = -1/c(\partial B/\partial t) \quad (1)$$

$$\nabla \times H = 1/c(\partial D/\partial t + (4\pi/c)J \quad (2)$$

$$\nabla \cdot B = 0 \quad (3)$$

$$\nabla \cdot D = 4\pi\rho \quad (4)$$

Setting the conduction current density J to zero, and eliminating the magnetic field from the two curl equations gives the usual wave equation for the electric field, $\nabla \times \nabla \times E = -\mu\epsilon/c^2 \partial^2 E/\partial t^2$. For a transverse electromagnetic wave, propagating in the z direction ($k_z \cdot E = 0$) and with the electric field polarized either along x or y and dependent only on the z coordinate, the one dimensional wave equation for E is given by:

$$E_y = E_0 e^{i(\omega t - k_z z)} \quad (5)$$

$$d^2 E_y/dz^2 - \mu\epsilon/c^2 \partial^2 E_y/\partial t^2 = 0 \quad (6)$$

For which, in light of the plane wave form in (5), (6) gives the required form for the propagation wavevector in the dielectric, $k_z = k_0(\mu\epsilon)^{\frac{1}{2}}$, where $k_0$ is the wavevector in the vacuum, $k_0 = \omega/c$. One usually represents the complex permeability and permittivity by $\mu = \mu' + i\mu''$ and $\epsilon = \epsilon' + i\epsilon''$.

The imaginary parts of these expressions represent energy required to overcome resistance to molecular motion coupled to E via electric or magnetic multipole moments characteristic of the molecular structure of a particular compound. In the microwave band this usually takes the form of rotational degrees of freedom. The magnetic domains align against local perturbing fields and the electric dipole moments align against collisional and local electric fields within the substance. At low frequencies, the dipoles can follow the fields with much shorter characteristic relaxation times. As the frequency increases, the relaxation frequency is approached and the losses increase, with the real part usually decreasing because the polarization coupling efficiency goes down.

Generally, the larger the permanent electric or magnetic dipole moment of a molecule, the larger the magnitude of $\mu\epsilon$ (large polarizability) and this usually results in a more lossy material when resonance is approached. Water is considered to have a relatively large permanent electric dipole moment.

Some of the useful measured properties which result from measuring $\mu\epsilon$ are the index of refraction and the attenuation coefficient as functions of frequency. These in turn yield the effective volume of material which can be illuminated at a given frequency and input power, the absorption of electromagnetic field energy (and subsequent heating and outgassing) and the radiation coupling efficiency (reflection coefficient or impedance).

The index of refraction, n, and the index of absorption, x, can be defined from $k_z$ in the usual manner as follows:

$$k_z = k_0 (\mu\epsilon)^{\frac{1}{2}} \quad (7)$$
$$= k_0 (n - ix), \text{ where } n = Re(\mu\epsilon)^{\frac{1}{2}}, x = Im(\mu\epsilon)^{\frac{1}{2}}$$

The absorption coefficient $\alpha$ can be identified from the Poynting flux (S) attenuation, given by: $S = c/8\pi Re(E \times H^*)$ and from (1) the electric field is given by $$E = E_0 e^{i\omega t - ik_0 nz - k_0 xz}, \text{ and } H = B/\mu = (\epsilon/\mu)^{\frac{1}{2}} E \quad (8)$$

and consequently $$S = (c/8\pi) Re(\epsilon/\mu)^{\frac{1}{2}} E_0^2 e^{-2k_0 xz} \quad (9)$$

The quantity $\alpha = 2k_0 x$ is the power absorption coefficient in terms of the local fields. The characteristic length for incident power to drop to 1/e of its initial value within the material is $\lambda = 1/\alpha$.

The power absorption per unit volume at any point, $J \cdot E$, is given from the conservation of energy:

$$\partial u/\partial t + \nabla \cdot S = -J \cdot E \quad (10)$$

which for steady state conditions ($\partial u/\partial t=0$) gives, $$J \cdot E = -\partial S/\partial z = -\partial/\partial z \, [c/8\pi E_0^2 Re(\epsilon/\mu)^{\frac{1}{2}} e^{-2k_0 x}] \quad (11)$$
$$= (\omega/4\pi)E_0^2 e^{-2k_0 x} Re(\epsilon/\mu)^{\frac{1}{2}} Im(\mu\epsilon)^{\frac{1}{2}}$$

It is the above quantity which is of primary interest in applying the microwave energy to heating the local CHC contaminant. The measured values of the complex $\mu$ and $\epsilon$ as functions of frequency allow estimates of the local rate of heating and the power level at any point in the material per unit field strength or input power level. The correlation of this with the effective required input power level needed in order to achieve a given level of local temperature rise (involving local heat transfer in the material), and outgassing characteristics can be determined from high power lab tests using actual core samples.

J·E can be expressed in terms of the measured quantities, $\epsilon'$, $\epsilon''$, $\mu'$, $\mu''$, as taken from a vector network analyzer.

$$Re(\epsilon/\mu)^{\frac{1}{2}} = \frac{[(\epsilon'\mu' + \epsilon''\mu'')^2 + (\epsilon''\mu' - \mu''\epsilon')^2]^{\frac{1}{4}}\cos(\Theta/2)}{(\mu''^2 + \mu'^2)^{\frac{1}{2}}} \quad (12)$$

$$Im(\epsilon\mu)^{\frac{1}{2}} = [(\epsilon'\mu' - \epsilon''\mu'')^2 + (\epsilon''\mu' + \mu''\epsilon')^2]^{\frac{1}{4}}\sin(\phi/2) \quad (13)$$

$$\phi = \tan^{-1}\left(\frac{\epsilon''/\epsilon' + \mu''/\mu'}{1 - \mu''\epsilon''/\mu'\epsilon'}\right); \quad (14)$$

$$\Theta = \tan^{-1}\left(\frac{\epsilon''/\epsilon' - \mu''/\mu'}{1 + \mu''\epsilon''/\mu'\epsilon'}\right)$$

Note that in case the ratio of imaginary to real parts of $\epsilon, \mu$ is small compared to unity, which often happens, the expression for the absorbed power per unit volume to a first approximation becomes proportional to $f\epsilon''$;

$$J \cdot E \simeq \frac{E_0^2 e^{-\alpha z}}{4} f[\epsilon'' + \mu''(\epsilon'/\mu')], \quad (15)$$

where $f$ is the radiation frequency.

A total radiated power of 25 MW will be taken as a maximum design power level for remediation of a typical subsoil "pulse zone" of at least ten cubic meters ($10^7 \text{cm}^3$). This zone may contain the equivalent of a uniformly distributed CHC contaminant up to about 7% by volume (e.g. one thousand kilograms). The system is operated at around one GHz frequency (L band), and may use up to ten parallel magnetrons or klystrons, with forced liquid coolant (water load) and heat exchanger, and a large external radiator structure.

Of course, for cleaning smaller quantities of CHC per zone, much lower power levels could be used. This is also the case for concentrated "plumes" of CHC or other locally dense regions, within an otherwise lightly contaminated solid, containing a total of only a few kilograms of CHC.

As each pulse zone is cleaned from the surface level down in a "zone cleaning" method, the screened pumping and RF coupling head is lowered further down the well shaft to the next subsoil pulse zone and cleaned. The eventual depth of the entire subsoil cleaned zone may be down to or exceeding the water table depth.

The RF system radiated power and energy requirement can be estimated from the required Poynting flux needed at the "skin depth" for the composite soil. This in turn depends upon the desired maximum temperature rise to be induced into the (initially) liquid phase CHC constituent of interest. After the pulses needed for vaporization have been applied, the residual heating flux required to maintain vapor temperature at the cleaning level can be estimated. The removal rate and efficiency depend upon the effective egress flow velocity of the CHC vapor and the thermal time constant for coupling the vapor heat content into other soil constituents, including water, sand, clay and silt. This egress velocity, in turn, depends upon the permeability of the soil type, either natural or as modified by the RF pulse, and the effective pressure gradient generated within the CHC vapor by both RF induced thermal gradients and gravitational head potential.

This method of cleaning is based upon removing the heated vapor via the in-situ screened pumping and RF well shaft system, at a rate such that only a very small fraction of the RF energy deposited within the CHC is conducted to the surrounding soil. The real part of the CHC permittivity (dielectric constant) tends to be one to two orders of magnitude smaller than water at about one GHz (e.g. water $Re(\epsilon) \simeq 80$, trichloroethylene $Re(\epsilon) \simeq 3$). This situation, in conjunction with the fact that the permanent dipole moment for most CHC compounds is near that of water, means that about 90% of the absorbed RF power can be coupled selectively into the CHC.

A simple way to understand the above result is to consider the relative dielectric constants and attenuation coefficients for all constituents present. Sand has a dielectric value of about 2, and a very small relative absorption coefficient compared to either water or CHC. On the other hand, pore water has a relatively high absorption coefficient, like the CHC, but almost no relative flux for this absorption to affect because of the difference in dielectric constant relative to all other soil constituents, including the host sand. Most of the flux is radiated through the host sand, but most losses are in the CHC.

For purposes of illustrating the principle of operation, a three-component soil model will be used. This model consists of sand, pore water and pore CHC substances, which are site dependent. The required volume microwave heating rate from the thermal analysis is given by $K_0 = 2\Delta T \lambda / L_0^2$, which means a required Poynting flux within the CHC of $S_c = K_0/\alpha_c$. Here, $\lambda$ is the CHC liquid phase thermal conductivity, $\alpha_c$ is the CHC attenuation coefficient at the radiation frequency, $L_0$ is a typical CHC pore length scale and $\Delta T$ is the impulsive temperate rise in °C. at the center of the CHC "droplet". This flux must be delivered to the maximum effective radius of operation, the microwave "skin depth", $\tau$.

The Maxwell-Garnett mixing relation for estimating the composite permittivity of the model gives the value for $\alpha_m$ and the effective RF skin depth, $\alpha_m^{-1}$. Each constituent is modeled as a small dielectric sphere, much smaller than the free radiation wavelength, and contained within a "host" material. In this case, the host is sand, with constituents water and CHC. The permittivities and other parameters are subscripted respectively as s, w and c. The electric field within a sphere of permittivity $\epsilon_i$, within a field $E_s$ and surrounding material $\epsilon_s$ is given by:

$$E_i = \frac{3}{(\epsilon_i + 2)} \epsilon_s E_s, \quad (16)$$

where $E_i$ is uniform within the sphere.

The absorbed power, $P_a$, is related to the local flux by the conservation of energy:

$$J \cdot E = \Delta \cdot S + \partial U / \partial t, \quad (17)$$

where for steady state conditions relative to the RF energy density, U, means $$J \cdot E = \sum_i a_i S_i = a_s S_s + a_w S_w + a_c S_c, \text{ [Watts cm}^{-3}\text{]}, \quad (18)$$

RF loss to soil per unit volume.

$P_\alpha = V_t(J \cdot E)$, the required power in the pulse zone volume, $V_t$.

Using the above local field ratios provided by equation (16), one can relate the local Poynting flux in each constituent to that in the CHC required for heating to any given temperature rise $\Delta T$, $S_c$. The Poynting flux in each constituent is given by the expression $S_i = c(\mu \cdot \epsilon)_i^{\frac{1}{2}} E_i^2 / 8\pi \exp(a_i z)$; also, for illustrative purposes, one can consider the magnetic permeability to be a constant near unity compared to variations in the permittivity.

$$P_\alpha = V_t S_c \left[ a_w f_w \left[ \frac{\epsilon_w}{\epsilon_c} \right]^{\frac{1}{2}} \left( \frac{2 + \epsilon_c}{2 + \epsilon_w} \right)^2 + a_s f_s \frac{1}{\epsilon_c^{\frac{1}{2}} \epsilon_s^{3/2}} \left\{ \frac{2 + \epsilon_c}{3} \right\}^2 + a_c f_c \right] \quad (19)$$

where the $f_i$ are the volume fractions occupied by each constituent. The condition that $L_0 << a_i^{-1}$ has been assumed.

The total system radiated power can be estimated from $\Gamma$ and the average Poynting flux within the aggregate soil, $S_m$. The total power is given by: $P_t = AS_m$, where A is total area normal to the propagation direction, $A = 2\pi \Gamma Y$, where Y is the depth of a typical pulse zone. The average attenuation coefficient is $a_m$. System efficiency is $\eta = P_a / P_t = a_m V_t / A = \Gamma^{-1} V_t / A$. $S_m = (P_a / V_t) \Gamma$ and plane wave flux at any point z is given by $S(z) = S(0) \exp(-a_m z)$. For cylindrical radiation one would have $S(r) = S(r_0 / r) \exp(-a_m z)$.

The average Poynting flux, $S_s$, can also be computed by directly averaging the constituents $S_i$ over the area using appropriate scattering cross-sections. Approximating the scattering cross-sections on theoretical grounds produces values of $S_s$ ranging from about the same to two or three times as large as the above value for $S_m$, as determined from volume averaging the losses. The cross sections are a function of the relative dielectric constants as well as the geometrical cross section of each constituent.

In order to illustrate the parametric sensitivity for the scattering model, the average flux can be directly calculated. The total scattering cross sections for water and CHC are represented by $\sigma_i$, $\sigma_c$ at the radiation frequency, and the area fraction of each constituent by $s_i = n_i \delta_i \sigma_i$, where $\sigma_i$ is the interparticle distance and $n_i$ is the constituent particle density. In terms of the $f_i$, these quantities can be written $n_i = f_i / v_i$, $\delta_i = m_i^{-\frac{1}{3}} = (v_i / f_i)^{\frac{1}{3}}$. Then for the average Poynting flux, in terms of $S_c$ and the geometric volume for each constituent $v_i = 4\pi \Gamma_i^2 / 3$, the following relation exists:

$$S_s = S_c \left\{ \frac{\epsilon_w^{\frac{1}{2}}}{\epsilon_s^{\frac{1}{2}}} \frac{(2 + \epsilon_c)^2}{(2 + \epsilon_w)^2} \left( \frac{f_w}{v_w} \right)^{\frac{1}{3}} \sigma_w + \frac{1}{\epsilon_c^{\frac{1}{2}} \epsilon_s^{3/2}} \frac{(2 + \epsilon_c)^2}{9} (1 - S_w - S_c) + \left( \frac{f_c}{v_c} \right)^{\frac{1}{3}} \sigma_c \right\} \quad (20)$$

If the scattering cross sections are represented as multiples of the geometric cross-section, $\sigma_i = \beta_i \pi r_i^2$, it is found from a detailed numerical analysis that Ss varies with respect to Sm in the range of about unity to two or three as the $\beta_i$ range from one to ten and $f_i$ from one to ten percent.

Based upon the above relations, estimates of $\eta$, $P_a$, and $P_t$ can be made for a range of typical CHC contamination and pore water values for $f_w$ and $f_c$. In addition, estimates for soil egress efficiency, a measure of the coupling of thermal energy into soil constituents other than CHC, can be made.

For making estimates, a radiation frequency of about 1 GHz is assumed. A typical CHC contaminant is trichloroethylene, for which $\epsilon_c \approx 3.0$. A typical case might have values $f_w = 0.01$, $f_c = 0.04$, $f_s = 1 - (f_w + f_c) = 0.95$, $\epsilon_w = 80$, $\epsilon_s = 2.0$. The imaginary parts at this frequency are known for water and sand, and are respectively 4.5 and $2 \times 10^{-4}$. The theoretical value of the imaginary part for this CHC is estimated at about one fourth that of water, or about 1.125 (actual values may range from that of water to as little as one tenth that of water). The attenuation coefficients correspond to $a_w = 0.105$ (cm$^{-1}$), $a_s = 3 \times 10^{-5}$ and $a_c \approx 0.025$. Equation (18) then gives the value $J \cdot E = 0.64$ W$-$cm$^{-3}$. A required temperature rise of 20° C. is assumed and a sand pore size of $L_0 = 0.55$ mm, leading to $S_c = 2\Delta T \lambda / L_0^2 a_c \approx 6.4 \times 10^2$ W$-$cm$^2$. The value for $\Gamma^{-1}$ is about 200 cm for these parameters, so with a one-meter pulse zone depth, this provides a pulse volume of $1.26 \times 10^7$ cm$^3$ ($\approx 10$ m$^3$). The total absorbed power is then $P_\alpha \approx 8.1$ MW.

From the relations given above for $P_t$, Sm and A, the average Poynting flux at radius $\Gamma$ of Sm $= 0.2$ $S_c$ is implied. Then the total radiated power required is given by $P_t = SmA = (0.2)6.4 \times 10^2 2\pi \Gamma L \approx 16.2$ MW. The overall microwave efficiency is then $\eta = 8.1 / 16.2 = 50\%$, a result independent of the pulse zone surface to volume ratio as long as one is considering coupling into a zone with radius $\Gamma$, and $a_m = \Gamma^{-1}$. Even reducing the CHC absorption coefficient to only one tenth that of water, and at the same time increasing the water volume fraction present from 1% to 15% has little effect on these results. The effective radius of the pulse zone, $\Gamma$, can be maintained at $\geq 2$ M with 15% water up to about 8% CHC, a very heavy subsoil contamination.

The reason the water content does not have a greater influence on the absorption, even though it has an attenuation coefficient at least as large as the CHC, is to be found in the extreme "miss-match" of its large permittivity with respect to either sand or CHC (see equation (19) above). Water exhibits a large polarizability compared to CHC, even though the CHC has a comparable permanent electric dipole moment. The much larger CHC molecules are not as free to reorient themselves in an applied electric field and their polarizability and resultant dielectric constant are much smaller, more closely matched to the sand. Hence, the water acts with a comparable specific loss, but the relative RF energy density present within the water is much lower than that in either the sand or the CHC.

Practical considerations affecting the average CHC egress efficiency are the local CHC temperature rise, RF coupling efficiency, soil effects (including RF induced permeability increase), and CHC vapor egress rates and residual soil energy transfer. First approximations for the potential range of CHC removal rates and efficiencies can be obtained using the following simple model.

The relative energy transfer from the CHC vapor, once initially vaporized, from the most distant RF heated radius ($\Gamma$), to host material (water, sand, etc.), as the heated vapor flows down the pressure gradient and out the collection system located in the well shaft, can be estimated. To be energy efficient, the heat exchange between the CHC and host materials should be a minimum. The following definitions are used:

$T_h$ = temperature of CHC vapor after initial RF pulse at $r = \Gamma$ $T_c$ = temperature of CHC vapor at well shaft collector $r = r_0$ $T_b$ = "bath" temperature (host sand, water, etc.) $r_0 < r < \Gamma$ $\bar{m}$ = CHC mass flow rate = $\rho v a \{gm-sec^{-1}\}$, $a$ = egress channel area $h_1$ = convection coefficient per unit length = $0.1 c_p \mu^{0.2}(\bar{m}/D^{0.8})$ $D$ = CHC channel diameter (cm), $\mu$ = CHC viscosity (poise), $c_p$ = specific heat $K$ = volume rate of RF absorption (watts-cm$^{-3}$) by CHC $\dot{Q}$ = total convective channel heat flow = $\bar{m}c_p(T_h - T_c)$ (cal-sec$^{-1}$)

$L$ = total channel length corresponding to a given temp drop $N_r$ = Reynolds number = $\rho v D/\mu$; Prandtl number $N_p = c_p \mu/k$ $v$ = average egress velocity = $\Lambda/\mu(dP/dx)$ $\Lambda$ = soil permeability (cm$^2$); $dP/dx$ = vapor pressure gradient An estimate of the required microwave volume heating rate, K, needed in the vapor for an arbitrary channel length, for a given D, which will result in a temperature drop from $T_h$ to $T_c$ over this length can be calculated. The assumed value for the temperature drop should be consistent with the assumed pressure gradient, dP/dx, which is determined by gravity head, RF volume heating and conduction and convection loses to the host material. To eliminate unnecessary mathematical details, rectangular coordinates will be used.

The differential equation describing this situation can be derived as follows: The differential rate of heat transfer by forced convection within the channel for constant $\mu$ and $c_p$ is simply $d\dot{Q} = -\bar{m}c_p dT$, where dT is the temperature difference across a small differential element of channel, dx. If one takes the specific heat and mass flow rate to be essentially constant along the channel, this can be integrated to give the total heat flow, $\dot{Q} = \bar{m}c_p(T_h - T_c)$ which can be written $-dT/d\dot{Q} = (T_h - T_c)/\dot{Q}$. On the other hand, this must equal the net rate at which heat energy is given the same elementary channel volume by the RF and by convective and conductive losses to the surrounding host material perpendicular to the flow direction, $$d\dot{Q} = h_1(T - T_b)dx - (Ka)dx. \quad (21)$$

This yields the following equation for the temperature distribution, after replacing $T \rightarrow (T - T_b)$:

$$\frac{dT}{dX} = \frac{(T_h - T_c)}{\dot{Q}}[Ka - h_1 T], \text{ or} \quad (22)$$

$$\frac{dT}{dx} + \beta T = \alpha, \quad (23)$$

where $\beta = (T_h - T_c)h_1/\dot{Q}$ and $\alpha = (T_h - T_c)Ka/\dot{Q}$

At this point, the RF heating per unit volume, K, is an arbitrary function of x. A simple and instructive analytic solution can be obtained for the case of a uniform heating rate, with a constant value of K. The solution of this simple equation is given by the following, with $T(O) = T_O$ and $T(L) = T_L$:

$$T(x) = \alpha/\beta + (T_0 - \alpha/\beta)\exp(-\beta x), \quad (24)$$

or in terms of the channel length, $$L = \frac{1}{\beta} \ln\left(\frac{(T_0 - \alpha/\beta)}{(T_l - \alpha/\beta)}\right) \quad (25)$$

The meaning of this equation is that a vapor having a temperature of $T_0 = T_h - T_b$ at the outer RF region (x=0, r=$\Gamma$=L) will be delivered to the well shaft region (x=L, r=$r_o$) with temperature $T_L = T_c - T_b$. Because in most cases $L \geq \beta^{-1}$, and the logarithmic dependence, the approximate value of K needed is $K \approx \alpha/\beta(h_1/\alpha)$ to accommodate a given channel length L ($\approx \Gamma$).

As a numerical example, assume $v = 20$ cm/sec. This is the value determined in average sand, which has a permeability of about $10^{-6}$ cm$^2$, when driven by a pressure gradient of 0.3 atm/m ($N_r = 130$, laminar flow). A credible range for this parameter would be $10 < v < 100$ cm/sec. The pressure gradient is initiated by the heating pulse radiation distribution and the pumping system along with the gravity head, if any. For purposes of this estimate, one can ignore the thermal and gravity effects and assume at approximately one atmosphere pressure drop occurs across the length $\Gamma$ (the previously cleaned pulse zone is under positive pressure from the RF feed pneumatic system and also supplies replacement air as required).

With the above $v$ and using trichloroethylene as the CHC, $\rho \approx 10^{-2}$, $\mu = 10^{-4}$ poise, so $\bar{m} = 6.28 \times 10^{-3}$ gm/sec if the average sand channel width is taken as 2 mm (sand pore spacing $r_s \approx 1$ mm). The boiling point for $C_2HCl_3$ is about 85° C. at one atmosphere, so the vapor should not drop below about 90° C. at the pump inlet. Now $\beta \approx 0.1(\mu/m)^{0.2}/D^{0.8}$, which for these parameters yields $\beta \approx 0.12$. Assuming a uniformly distributed 1% by volume CHC content (i.e. 140 Kg) in the pulse zone, it would require about 25 MW for $P_t$ to initiate with a $\Delta T$ of 130° C. over the entire mass of CHC. Since an average temperature rise of only about 100° C. is required, this is a conservative value for $P_t$. Then using values of $T_b = 20$° C., $T_h = 150$° C. and $T_c = 90$° C., the required value of K is given by:

$$\hbar = (T_c - T_b)0.4c\rho\mu^{0.2}(\dot{m})^{0.8}/(\pi D^{2.8}) \approx 0.5 \text{ Watts/cm}^3 \quad (26)$$

assuming a $c_p$ of about half that of water. This value is sufficient to keep the vapor warm during its egress trip out of the host and can be accommodated with the assumed flux present for the initial pulse vaporization. The RF vapor heating is nearly the same per unit mass as for liquid phase. The forced egress time constant is about $\Gamma/v$sec. If $\Gamma$ is assumed to be about 2 m, this time is of the order of several seconds. The energy efficiency corresponds to supplying a loss to the host material of less than the original heating pulse energy stored internally in the CHC. Since the host material contains about two orders of magnitude more mass, the efficiency of selective microwave heating of CHC and forced egress is at least ten to a hundred fold better than heating the entire mass of the soil, as is done in retorting processes, for example. The designer has a certain amount of control over the flow rate by adjusting the RF radiation pattern. The effective channel width for heat transfer may be affected by the expanding CHC gas during the high pressure, vaporizing pulse, and by the actual distribution of CHC within the particular site (e.g. streamers, plumes and strata interstitial zones containing macroscopic values for D). The effective value of D will essentially be an empirical parameter determined from laboratory loss and egress measurements.

One case where the RF-induced soil effects are particularly useful is in remediating silt and clay soils, which normally are very porous ($\approx 30\%$), but are of nearly closed cell structures. The impulsive RF vaporization heating can force the cells into an open-cell type structure and help to facilitate rapid egress in the resulting channels.

Microwave absorption in soil depends upon the properties of the individual molecular structure of constituent materials, the degree and type of bonding to host material, ionic conductivity and the concentration and mixture ratios of these materials, in a particular contamination site. Measurements of these properties are preferably made for actual site materials to make accurate projections as to required power and frequencies for influencing particular parameters at each site.

In the case of CHC contaminants, the retention in the pores of sandy soil and the entrapment by water in porous material, and as emulsions in both saturated and unsaturated zones, may both be affected. A large reduction in the interfacial tension has the effect of increased release and flow of CHC to a collection and removal system, even under a one-g gravity pressure gradient. In the saturated zone, selective resonance absorption by the CHC component leads to an increase in vapor pressure and CHC egress by well pumping at reduced power densities. Also, in the unsaturated zone, the gas mound increases in both size and pressure as CHC is converted to vapor at an increased rate and pressure, allowing egress to the surface or well shaft for venting or collection.

In addition to direct effects, the characteristics of which must be determined from core samples and CHC material, there is the influence of a sudden temperature rise in the CHC (or $H_2O$ in immediate proximity to the CHC) upon parameters affecting CHC egress rate. Among these are the viscosity, vapor pressure and surface and interfacial tension.

The microwave energy required for a given temperature rise in the contaminant lower than that by other means because the microwave radiation can penetrate through sand or other extraneous, relatively low loss material (making up the bulk of the volume) and be absorbed on a time scale much shorter than that required for locally conducting the energy into the surrounding sand or other soil.

In addition, the ability to radiate in-situ relatively large volumes of soil zones from a given source and single bore site makes site coverage less expensive, since the soil remains essentially undisturbed and in a natural state.

The vapor pressure of most CHC contaminates is a rapidly rising function of temperature, while the interfacial and surface tensions are reduced by an increase in temperature. In most cases, including water, the vapor pressure is nearly doubled by increasing the local temperature by about 10° C. around the 20° C. value. Some additional values for the tensions are given below:

| Compound | $H_2O$—CHC interfacial tension $\gamma$ (ergs/cm$^2$) | (3 GHz) $\epsilon''$ | (3 GHz) $\epsilon'$ | Surface tension $\gamma$ (ergs/cm$^2$) | Temp. (°C.) |
|---|---|---|---|---|---|
| $H_2O$ (ref) | | 10.0 | 80.0 | 72.75 | 20.0 |
| $CCl_4$ | 45.0 | — | 2.20 | 27.0 | 20.0 |
| | | | | 17.3 | 100.0 |
| | | | | 6.5 | 200.0 |
| $CH_2Cl_2$ | — | | 9.08 | 50.8 | 20.0 |
| $C_2Cl_4$ | — | | — | 31.7 | 20.0 |
| $C_2H_3Cl_3$ | — | | — | 22.0 | 114.0 |
| $C_2HCl_3$ | — | | 3.40 | — | |

A minimum impulsive change in $H_2O$ or CHC temperature of at least 20° C. will be assumed, with either in-situ water or CHC heating assumed as the absorbing mechanism. The thermal response of a water or CHC contaminant can be estimated from a simple model. Consider a slab geometry, with the water contained between two sand slabs.

The equation for heat flow in the region of microwave heating is given by the following:

$$\frac{\partial^2 T}{\partial x^2} - h \frac{\partial T}{\partial t} = \frac{-K_f(t)}{\lambda}, \quad (27)$$

where $h=(\rho c/\lambda)$, $\rho$ is density (gm cm$^{-3}$), $\lambda$ is thermal conductivity (joule/sec °C. cm), and c is specific heat (joule/gm °C.).

$K_f$ is a uniform volume source of microwave energy absorption within either the CHC or water region (joule sec$^{-1}$ cm$^{-3}$), which is a specified function of time. The boundary conditions are $T'(x,t) = T(x,t) - T_b = 0$ at $x = \pm l_0$, where it is assumed the average soil temperature acts as a large thermal bath of temperature $T_b$, which remains essentially constant during a given heating pulse time constant. The other boundary condition is imposed by symmetry, with $\partial T'/\partial x = 0$ at $x=0$ (the center of the water or CHC slab region).

Laplace transforming the above equation and solving for T' gives the result:

$$T'(x,s) = A(s)\sinh(\sqrt{hs}\, x) + B(s)\cosh(\sqrt{hs}\, x) + C(s) \quad (28)$$

The boundary conditions and the differential equation then provide the values $B(s) = -K_f(s)/sh\lambda \cos h(l_0\sqrt{hs})$, $A(s) = 0$ and $C(s) = K_f(s)/sh\lambda$. The resulting temperature distribution in the water or CHC for an arbitrary heating pulse shape is then:

$$T'(x,s) = \frac{K_f(s)}{sh\lambda} \left[ 1 - \frac{\cosh(\sqrt{hs}\ x)}{\cosh(\sqrt{hs}\ l_0)} \right] \quad (29)$$

The applied microwave heating pulse rise time is much shorter than the thermal response time constant, $\tau$, and can be adequately represented by a unit step function, of magnitude $K_0$, given by $K_f(s)=K_0/s$. Applying the final value theorem to the above input, $\lim_{s\to 0} sT'(x,s) = T'(x,\infty) = K_0[l_0^2 - x^2]/2\lambda$.

In addition, the time response can be obtained by finding the inverse transform for $T'(x,s)$. With $\alpha = x/l_0$, this results in the following relation:

$$T'(\alpha,t) = \qquad (30)$$

$$\frac{K_0 l_0^2}{2\lambda} \left[ (1 - \alpha^2) - \frac{32}{\pi^3} \sum_{n=1}^{\infty} \frac{(-1)^{n+1}}{(2n - 1)^3} \cos[\pi/2(2n - 1)\alpha] e^{\frac{-(2n-1)^2\pi^2 t}{4hl_0^2}} \right]$$

where the thermal time constant $\tau \simeq hl_0^2/2$. As an example, for water at 20° C., $\lambda \simeq 5.98 \times 10^{-3}$, $\rho \simeq 1.0$, $c \simeq 4.182$, resulting in $h \simeq 7.0 \times 10^2$ and a time constant of $\tau \simeq 3.5 \times 10^2 l_0^2$. For an average sand grain size of about 0.55 mm this provides a time constant of about 1 sec, if one is primarily heating water. For CHC, the specific heat is assumed the same as water and the thermal conductivity is about a factor of five smaller.

This provides the first estimated macroscopic variable, the microwave heating pulse length. Pulse lengths will be of the order of one second or less.

The total pulse power and frequency dependence for a given total processing volume will be estimated for a single 4" diameter bore to approximately water table depth. The field power supply is connected to an existing power grid or a portable generator set. The downhole apparatus consists of a high power, vacuum, wide band coaxial cable or a waveguide. The same hole is used for pumping and supplying the microwave power. The impedance matching circuit, radiating structure and pumping head are an integral unit. A slot antenna or series of small exponential horns couples power into the soil at depth.

The axis of the central lobe of the radiation pattern makes an approximately 60-degree angle with the local vertical and maintains cylindrical symmetry about the vertical axis. Thus a funnel shaped region is defined for radiation processing, with an axis coinciding with the bore, a radius approximately one skin depth ($\sigma$), and an axial (down-hole) depth (L) of about two meters. The processed volume $V_p$ is then approximately $\pi\sigma^2 L$ and the radiation profile cross section area at maximum penetration of $S_r = 2\pi\sigma L$.

When one or more impulses are applied, the locally heated zone CHC permeability will increase by a factor of at least two over that of the zone immediately below. Because of the angle of the zone relative to local g, any mobilized liquid phase will run down the funnel into the well bore for collection or in-situ pumping. Also, the heavy CHC vapor will accumulate a large mound centered on the bore and can be easily removed by pumping. After several such pulses the apparatus is lowered to the next level, L meters further down hole and the process repeated until all contaminant has been removed.

This process of "zone cleaning" can be applied several times over-all, at increased power levels if needed, until the soil is cleaned down to acceptable levels of CHC contaminant. For personnel safety reasons and as an added precaution, a flexible circular metallic screen matting, of radius 1.56 meters, will be applied over the ground level to prevent any accidental release of microwave power of appreciable level above ground during cleaning.

The required minimum equivalent plane wave Poynting flux, $S_0$, needed at any point to raise the local water temperature by $\Delta T$ °C. per pulse can be found by equating the power dissipated per unit volume to $K_0$ from the above thermal analysis:

$$S_0 = \frac{2\lambda \Delta T}{l_0^2 \alpha_\omega}, \quad (31)$$

where all values are 100% water content.

A figure of $V_p = 10$ M$^3$ of soil per pulse would require a radiation radius of about two M and depth of one M. If cleaned to a water table depth of about 100 meters, a total of about 1000 cubic meters of soil would be cleaned per 4" well site. The entire apparatus would then be moved to another drilling site.

The following table lists some values of $\alpha_m$, $\alpha_\omega$ vs frequency for a soil pore-water fractional volume ratio of 0.15% and 15%:

| Frequency (GHz) | $\alpha_m$ (cm$^{-1}$) $f_\omega = 15\%$ | $\alpha_m$ (cm$^{-1}$) $f_\omega = 0.15\%$ | $\alpha_\omega$ (cm$^{-1}$) | 6 (M) 0.15% | 15% |
|---|---|---|---|---|---|
| 1.0 | $6.16 \times 10^{-4}$ | $4.93 \times 10^{-5}$ | 0.105 | 203 | 16.23 |
| 3.0 | $3.87 \times 10^{-3}$ | $1.64 \times 10^{-4}$ | 0.70 | 61 | 2.58 |
| 10.0 | $5.69 \times 10^{-2}$ | $9.37 \times 10^{-4}$ | 8.63 | 11 | 0.17 |

A radiation "skin depth" $\sigma$ of about 2 meters is practical without undue attenuation with $f_i = 15\%$ below 3 GHz. With $f_i = 0.15\%$ there is no practical limitation, even at 10 GHz (x-band), and with an L of about a meter provides a 10 M$^3$ single zone processing volume per pulse even with a processing radius of only 2 M. These results assume a very small average volume fraction of CHC present, so the absorption is determined mainly by the water content.

For this processing geometry, the total radiation area at maximum penetration is $S_r = 2\pi RL$, and processing volume $V_T = \pi R^2 L$, and the total system radiated power requirement $P_T$, needed in order to provide the heating Poynting flux $S_0$ within the water dielectric, would be given by $P_T = (J \cdot E)_m V_T$, where $(J \cdot E)_m$ is average power loss per unit volume, or:

$$P_T = V_T K_0[f_i + (1-f_i)(\alpha_s/\alpha_\omega)\ (\epsilon_\omega/\epsilon_s)^{3/2}] \quad (32)$$

If the cylindrically expanding Poynting flux drops off as $r^{-1}$, of course, then for the same total power the temperature rise between the power coupler and this outer radius would vary from about the boiling point of H$_2$O to $\Delta T$°C. over the radial distance R, so in this sense the system power estimate is a maximum.

For a soil volume per pulse of ten M$^3$, $f_i = 15\%$ and 3 GHz, for example, a total system power of about 193.6

MW would be needed for a fraction of a second (one thermal time constant). The overall efficiency for water heating at this volume fraction would be about 62%, with 38% residual heating going into the sand.

However, at $f_i=0.15\%$ this would be reduced to about 87.8 MW (5.8 MW at X-band), which can be met at this frequency using conventional magnetron, klystron or other X-band sources paralleled on the drive line system. Note the $l_0^2$ dependence, with slightly finer pore size down to low average of about 0.2 mm reducing the pulse length time constant to less than 0.05 sec. and, if an accompanying pore fraction of volume reduction occurs, the power could also be reduced even further.

The above figures also agree with the total required energy needed in the water dielectric to increase the temperature, $\Delta E = M_\omega c \Delta T$, where $\Delta E = P_T \tau$.

As noted above, for coupling only into the ground water content, the system power requirements are very substantial, depending upon the particulars of the site as to water fraction and the frequency to be used. The Maxwell-Garnett relations are valid for any number of constituents, such as sand, water and CHC material. However, the basic data giving the frequency dependent real and imaginary permittivity for each CHC contaminant must be known in order to make an estimate comparable to that made earlier for water. The relevant expression for average total system power for three constituents is given by:

$$P_T = V_T K_c / \alpha_c [f_\omega \alpha_\omega (\epsilon_c/\epsilon_\omega)^{3/2} + f_{CHC} \alpha_c + f_s \alpha_s (\epsilon_c/\epsilon_s)^{3/2}] \quad (33)$$

From the theoretical viewpoint, the larger moments of inertia of the CHC molecules as compared with water should produce a copious absorption spectrum down to $\simeq 1$ GHz. At these low frequencies, the water losses are quite small. In addition, the real part of the permittivity should be more nearly matched to that of the sand and water mixture because of the lower mobility of the larger molecules, even though the molecular dipole moments per unit volume are a fraction to comparable. The water heating estimates arrived at earlier were for water and sand, for which the factor $\epsilon_s/\epsilon_m$ was about 40 and is $2.52 \times 10^2$ when raised to the 3/2 power. For the CHC molecules (e.g. low frequency limit for $Re(\epsilon)$ for $CH_2Cl_2$, $C_2HCl_3$ are 9.08, 3.40 respectively), this ratio should be in the range of a few to unity. This factor, which essentially measures the difference in the electric fields in the surrounding material (in this case water and sand) to that within the included substance (in this case CHC), can reduce the system power needed to produce the same temperature rise in the CHC by about $1 \times 10^2$.

Some preliminary estimates for cleaning trichloroethylene ($C_2HCl_3$) in volumes of ten cubic meters per pulse are listed below. It is assumed that $\alpha_\omega/10 < \alpha_c < \alpha_\omega/4$ for all frequencies and $\pi > 2M$ for all entries. Note also the thermal conductivity for this CHC ($1.254 \times 10^{-3}$ Watt/cm °C.) is only about one fifth that of water. The values serve to indicate the great importance in determining actual frequency dependent values for the CHC compound parameters.

Note that the $\alpha_c/\alpha_\omega$ ratio is expected on theoretical grounds to be in the above range, because the CHC dipole moments are comparable to that of water, although the precise values for the absorption spectrum for the CHC molecules need to be measured. The difference of about a factor of ten for trichloroethylene arises because there are fewer CHC molecules per $cm^3$ by the ratio of molecular masses and inversely with density. At the same time the square of the dipole moments are in the ratio of about three to one. At any rate, based upon the theoretically expected CHC behavior, practical and cost effective levels of system power should result for processing large in-situ volumes of soil.

| Freq GHz | $P_T$ MW | % CHC efficiency | % $f_w$ | % $f_{CHC}$ | % $f_s$ | $\alpha_\omega$ | $\alpha CHC/\alpha_\omega$ | $\alpha_s$ |
|---|---|---|---|---|---|---|---|---|
| $C_2HCl_3$ Trichloroethylene 10 $M^3$ (Re$\epsilon \simeq 3.4$) | | | | | | | | |
| 1 | 7.20 | 83.1 | 15 | 3.6 | 81.4 | 0.105 | 0.25 | $3.0E_{-5}$ |
| 1 | 6.48 | 92.9 | 1 | 3.6 | 95.4 | " | " | " |
| 1 | 17.7 | 83.0 | 15 | 8.8 | 76.2 | " | 0.10 | " |
| 3 | 3.18 | 63.0 | 5 | 1.2 | 93.8 | 0.70 | 0.10 | $9.0E^{-4}$ |
| $CH_2Cl_2$ Dichloromethane 10 $M^3$ (Re$\epsilon \simeq 9.0$) | | | | | | | | |
| 1 | 37.2 | 89.8 | 10 | 20 | 70.0 | 0.105 | 0.25 | $3.0E^{-5}$ |
| 1 | 5.8 | 28.7 | 10 | 1 | 89.0 | " | " | " |
| 1 | 35.1 | 95.2 | 1 | 20 | 79.0 | " | " | " |

Note that the efficiency is high, with only about 10% of the energy going into ten times the background mass. The average soil temperature would rise by only $\simeq 0.1°$ C. in raising the CHC temperature by about 20° C.

Once the CHC has been volatized by the initial pulse energy, the vapor may form what is known as a "vapor mound" within the soil. This vapor can occupy the residual space up to about 30% of the available total volume.

The vapor will be characterized by a much lower thermal conductivity, about an order of magnitude below liquid phase values, of about $10^{-4}$ in the same units used earlier. The density will also be down by about a factor of a thousand. A relatively large volume of such vapor with poor thermal contact will remain heated for some time. It will also require much lower microwave power to maintain a given temperature within the vapor mound, during which time the vapor is conducted from the soil via the pump system.

I claim:

1. A method of removing an undesired contaminant from a sub-surface soil matrix, said method comprising the steps of
    forming a bore hole in the soil,
    moving a source of microwave energy through said bore hole while radiating electromagnetic energy laterally into the soil at a frequency and power density which selectively heat said contaminant in the soil by resonance absorption of said electromagnetic energy,
    collecting fluids which enter the bore hole, and
    removing the collected fluids from the bore hole.

2. The method of claim 1 wherein said undesired contaminant is chlorinated hydrocarbons or radioactive wastes or mixtures thereof.

3. The method of claim 1 wherein said soil has sufficient hydrodynamic permeability to enable the heated contaminant to flow through the soil and into the bore hole.

4. The method of claim 3 wherein said soil includes sand, sandy loam, silt or gravel or mixtures thereof.

5. The method of claim 1 wherein said contaminant is selectively heated by excitation of molecular rotation states by dipole-dipole interactions in the contaminant.

6. The method of claim 1 wherein said electromagnetic energy is radiated in successive pulses.

7. The method of claim 1 wherein the contaminant is heated sufficiently to convert at least a portion of the contaminant in the soil to the gas phase.

8. The method of claim 1 wherein said source of microwave energy is a radiating antenna structure having an impedance matched to that of the soil region traversed by said bore hole.

9. The method of claim 1 wherein said fluids are collected along the length of the radiating structure and at the bottom of the bore hole and removed from the bore hole by pumping.

10. The method of claim 1 wherein said source of microwave energy comprises a microwave radiator and a signal generator coupled to each other by a microwave transmission line to enable the radiator to be moved through the bore hole.

11. The method of claim 4 wherein said microwave radiator comprises a slot antenna or multiple exponential horns.

12. The method of claim 1 wherein said electromagnetic energy is radiated in a pattern that is symmetrical about the axis of the bore hole, and is inclined upwardly from a horizontal plane passing through the source of the radiation.

13. The method of claim 1 wherein said source of microwave energy is at least one magnetron, kylstron, travelling wave tube, solid state device, or transit-time oscillator.

14. The method of claim 1 wherein said collected fluids include heated vapors.

15. A method of increasing the hydrodynamic permeability of a clay-type soil containing entrapped water or contaminant molecules, said method comprising the steps of forming a bore hole in the soil, and moving a source of microwave energy through said bore hole while radiating electromagnetic energy laterally into the soil at a frequency and power density which selectively heat said entrapped water or contaminant molecules sufficiently to vaporize said molecules and thereby create fissures in the soil to increase the hydrodynamic permeability of the soil.

* * * * *